US009001343B2

(12) United States Patent
Baba

(10) Patent No.: US 9,001,343 B2
(45) Date of Patent: Apr. 7, 2015

(54) INFORMATION PROCESSING APPARATUS AND METHOD THEREFOR

(71) Applicant: Canon Kabushiki Kaisha, Tokyo (JP)

(72) Inventor: Shohei Baba, Nishitokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/958,785

(22) Filed: Aug. 5, 2013

(65) Prior Publication Data

US 2014/0036295 A1 Feb. 6, 2014

(30) Foreign Application Priority Data

Aug. 6, 2012 (JP) .................................. 2012-174254

(51) Int. Cl.
*G06F 3/12* (2006.01)
*G06K 15/00* (2006.01)
*H04N 1/00* (2006.01)

(52) U.S. Cl.
CPC .......... *H04N 1/00896* (2013.01); *G06K 15/406* (2013.01); *H04N 2201/0094* (2013.01); *H04N 1/00344* (2013.01); *H04N 1/00891* (2013.01); *H04N 2201/0039* (2013.01); *H04N 2201/0091* (2013.01); *H04N 2201/0082* (2013.01); *G06F 3/1203* (2013.01); *G06F 3/1221* (2013.01); *G06F 3/1229* (2013.01); *G06F 3/1273* (2013.01); *G06F 3/1285* (2013.01)

(58) Field of Classification Search
None
See application file for complete search history.

(56) References Cited

U.S. PATENT DOCUMENTS

| 6,029,238 | A * | 2/2000 | Furukawa | 712/1 |
|---|---|---|---|---|
| 7,312,886 | B2 * | 12/2007 | Gomi | 358/1.15 |
| 7,406,611 | B2 * | 7/2008 | Takahashi et al. | 713/300 |
| RE42,170 | E * | 2/2011 | Furukawa | 712/1 |
| 8,584,137 | B2 * | 11/2013 | Yamauchi et al. | 718/106 |
| 8,780,399 | B2 * | 7/2014 | Morimoto | 358/1.15 |
| 2004/0036908 | A1* | 2/2004 | Yagita et al. | 358/1.15 |
| 2005/0232031 | A1* | 10/2005 | Fukano | 365/189.05 |
| 2006/0218272 | A1* | 9/2006 | Murakami | 709/224 |
| 2007/0076237 | A1* | 4/2007 | Kudo | 358/1.13 |
| 2008/0184235 | A1* | 7/2008 | Sawada et al. | 718/100 |
| 2009/0040551 | A1* | 2/2009 | Ohara | 358/1.15 |
| 2009/0179991 | A1* | 7/2009 | Mohammad | 348/207.2 |

(Continued)

FOREIGN PATENT DOCUMENTS

JP 2008-171323 A 7/2008

*Primary Examiner* — Satwant Singh
(74) *Attorney, Agent, or Firm* — Canon USA, Inc., I.P. Division

(57) ABSTRACT

An information processing apparatus includes a first management unit configured to manage identification information of a plurality of image forming apparatuses as management targets and an order of processing on the image forming apparatuses while associating the identification information with the order, a request unit configured to request, according to the order, device information from an image forming apparatus having identification information corresponding to the order, a removing unit configured to remove, if a power state of the image forming apparatus is a power saving state when the request unit requests the device information from the image forming apparatus, the identification information of the image forming apparatus from a management target by the first management unit, and a second management unit configured to manage the removed identification information together with timing information for specifying timing for returning the removed identification information as the management target by the first management unit.

11 Claims, 15 Drawing Sheets

(56) References Cited

U.S. PATENT DOCUMENTS

| | | | |
|---|---|---|---|
| 2010/0262691 A1* | 10/2010 | Shouno | 709/224 |
| 2012/0013948 A1* | 1/2012 | Morooka | 358/1.15 |
| 2012/0236359 A1* | 9/2012 | Mihara | 358/1.15 |
| 2012/0274964 A1* | 11/2012 | Kimura | 358/1.13 |
| 2013/0272723 A1* | 10/2013 | Imazeki et al. | 399/8 |

* cited by examiner

TASK

FIG.7

WAKE-UP NOTIFICATION
MANAGEMENT STORE

| DEVICE IDENTIFICATION INFORMATION | WAKE-UP NOTIFICATION FLAG ON |
|---|---|
| DEVICE IDENTIFICATION INFORMATION | WAKE-UP NOTIFICATION FLAG OFF |
| DEVICE IDENTIFICATION INFORMATION | WAKE-UP NOTIFICATION FLAG ON |
| ⋮ | ⋮ |
| DEVICE IDENTIFICATION INFORMATION | WAKE-UP NOTIFICATION FLAG ON |

FIG.8

POWER STATE STORE

| DEVICE IDENTIFICATION INFORMATION | POWER STATE |
|---|---|
| DEVICE IDENTIFICATION INFORMATION | POWER STATE |
| DEVICE IDENTIFICATION INFORMATION | POWER STATE |
| ⋮ | ⋮ |
| DEVICE IDENTIFICATION INFORMATION | POWER STATE |

FIG.9

TIMED TASK STORE

| TIMING OF STORING TASK IN QUEUE | TASK |
|---|---|
| TIMING OF STORING TASK IN QUEUE | TASK |
| TIMING OF STORING TASK IN QUEUE | TASK |
| ⋮ | ⋮ |
| TIMING OF STORING TASK IN QUEUE | TASK |

FIG.11

QUEUE STORAGE TIMING STORE

| DEVICE IDENTIFICATION INFORMATION | WHETHER TASK NEEDS TO BE STORED IN TIMED TASK STORE | TIME |
|---|---|---|
| A | 1 | 20 sec |
| B | 0 | 10 sec |
| C | 1 | 30 sec |
| ⋮ | ⋮ | ⋮ |
| G | 1 | 20 sec |

INFORMATION PROCESSING APPARATUS AND METHOD THEREFOR

BACKGROUND

1. Field of the Disclosure

Aspects of the present invention generally relate to a technique for managing an image forming apparatus.

2. Description of the Related Art

Conventionally, a management apparatus for acquiring and managing operational information of an image forming apparatus such as a printer or a copying machine has been known. It is known that the image forming apparatus is provided with a function for storing a print job of a user as a log, and a function for notifying the user of a power state. Further, due to an increased need for power saving, it is also known that the image forming apparatus is provided with a function for entering a power saving state (a sleep state) when the image forming apparatus is not used for a certain period of time.

In addition, the number of the image forming apparatuses that can be managed by a single management apparatus is also requested to be increased.

While the number of the image forming apparatuses that can be managed by a single management apparatus is requested to be increased, improvement in processing efficiency of the image forming apparatus is one of the important issues.

However, with the technique discussed in Japanese Patent Application Laid-Open No. 2008-171323, when information such as a counter or a job log is acquired from the image forming apparatus being in a sleep state, processing thereof needs to be held until the image forming apparatus shifts to a normal state from the sleep state, and thus it is problematic in that processing efficiency cannot be improved.

SUMMARY

According to an aspect of the present invention, an information processing apparatus comprises a memory and a processor in communication with the memory, the processor configured to control a first management unit configured to manage identification information of a plurality of image forming apparatuses as management targets and an order of processing on the plurality of image forming apparatuses while associating the identification information with the order, a request unit configured to request, according to the order managed by the first management unit, device information from an image forming apparatus having identification information corresponding to the order, a removing unit configured to remove, in a case where a power state of the image forming apparatus is a power saving state when the request unit requests the device information from the image forming apparatus, the identification information of the image forming apparatus from a management target by the first management unit so as to prevent the request unit from requesting the device information, and a second management unit configured to manage the removed identification information of the image forming apparatus together with timing information for specifying timing for returning the removed identification information as the management target by the first management unit.

Further features of the present disclosure will become apparent from the following description of exemplary embodiments with reference to the attached drawings.

BRIEF DESCRIPTION OF THE DRAWINGS

FIG. 7 is a diagram illustrating an example of a wake-up notification management store according to the first exemplary embodiment.

FIG. 8 is a diagram illustrating an example of a power state store according to the first exemplary embodiment.

FIG. 9 is a diagram illustrating an example of a timed task store according to the first exemplary embodiment.

FIG. 11 is a diagram illustrating an example of a queue storage timing store according to the first exemplary embodiment.

DESCRIPTION OF THE EMBODIMENTS

Various exemplary embodiments, features, and aspects of the invention will be described in detail below with reference to the drawings.

Figure 1:
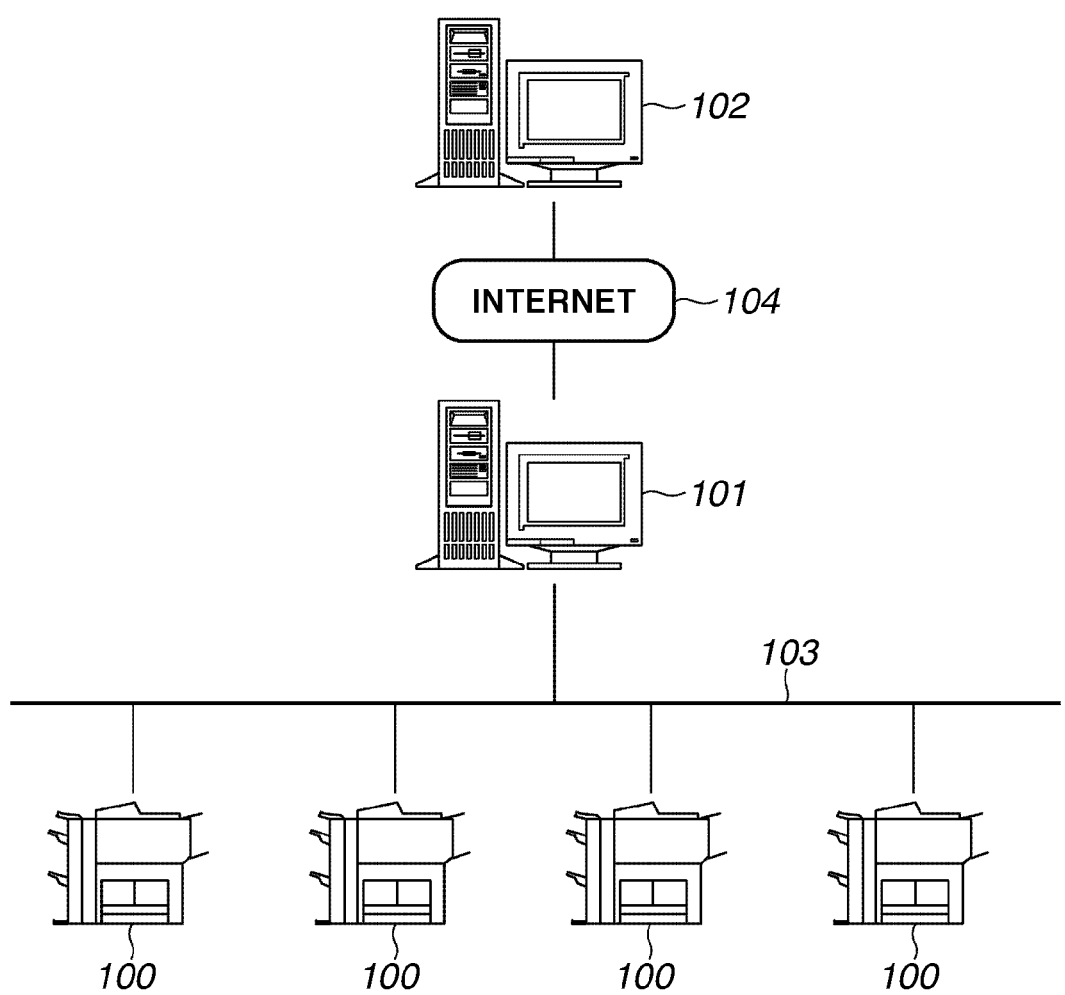
FIG. 1 is a diagram illustrating an example of a system configuration according to a first exemplary embodiment.

FIG. 1 is a diagram illustrating an example of a system configuration according to the present exemplary embodiment.

The system according to the present exemplary embodiment includes an image forming apparatus 100 such as a printer or a copying machine, a management apparatus 101 for managing an operational state of the image forming apparatus 100, and a central management apparatus 102 which includes a server function for managing the information sent from the management apparatus 101.

FIG. 1 illustrates a state in which a plurality of the image forming apparatuses 100 and the management apparatus 101 are connected via a local area network (LAN) 103. Further, FIG. 1 illustrates a state in which the management apparatus 101 and the central management apparatus 102 are connected via an Internet 104. However, the system may be configured in such a manner that the management apparatus 101 is disposed on an external network via the Internet 104, so that the image forming apparatus 100 and the management apparatus 101 are connected via the Internet 104. Furthermore, the management apparatus 101 and the central management apparatus 102 may be configured to be connected on an intranet via the LAN 103. In addition, the central management apparatus 102 may be configured to be connected to a plurality of the management apparatuses 101.

Figure 2:
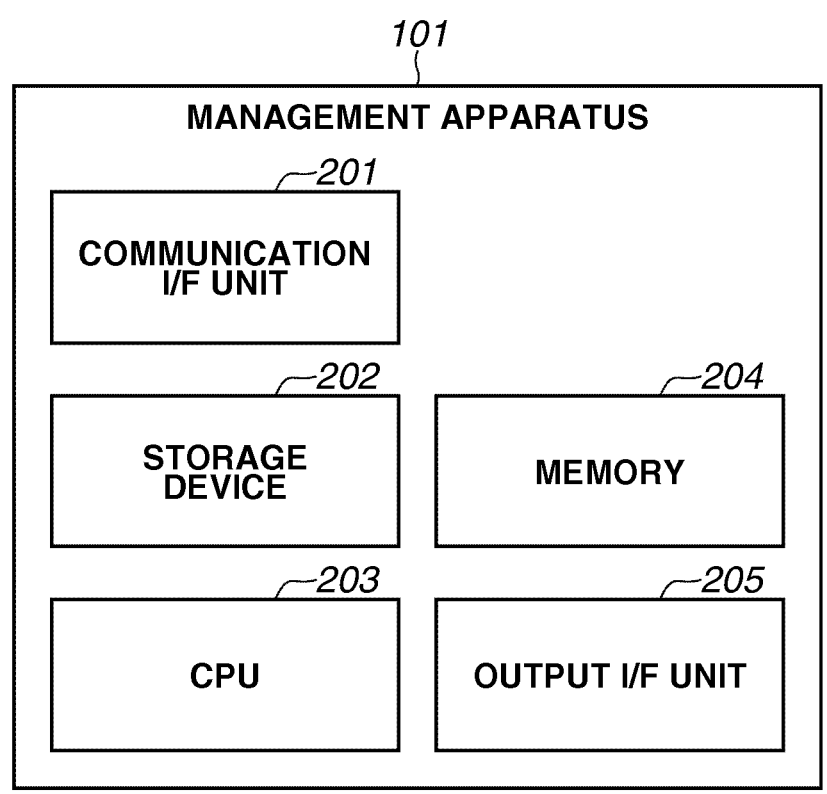
FIG. 2 is a diagram illustrating an example of a hardware configuration of a management apparatus.

FIG. 2 is a diagram illustrating an example of a hardware configuration of the management apparatus 101. The management apparatus 101 is an example of the information processing apparatus.

The management apparatus 101 includes a communication interface (I/F) unit 201, a storage device 202, a central processing unit (CPU) 203, a memory 204, and an output interface (I/F) unit 205.

The CPU 203 executes processing based on a program stored in the storage device 202, so as to realize functions of the management apparatus 101 (functions of software) and processing according to flowcharts, each of which will be described below.

The communication I/F 201 serves as a network interface connected to the LAN 103. The communication I/F unit 201 sends various requests to the image forming apparatus 100, and acquires operational information of the image forming apparatus 100.

An operating system (OS), a program for acquiring and managing log information of the management-target image forming apparatus 100 (hereinafter, simply referred to as "image forming apparatus 100"), and data such as a power state of the image forming apparatus 100 are stored in the storage device 202.

The CPU 203 loads the program into the memory 204 from the storage device 202 and executes the program to perform various kinds of control processing.

The output I/F unit 205 is connected to an output device such as a display unit and outputs an execution result of the program to the output device.

Figure 3:
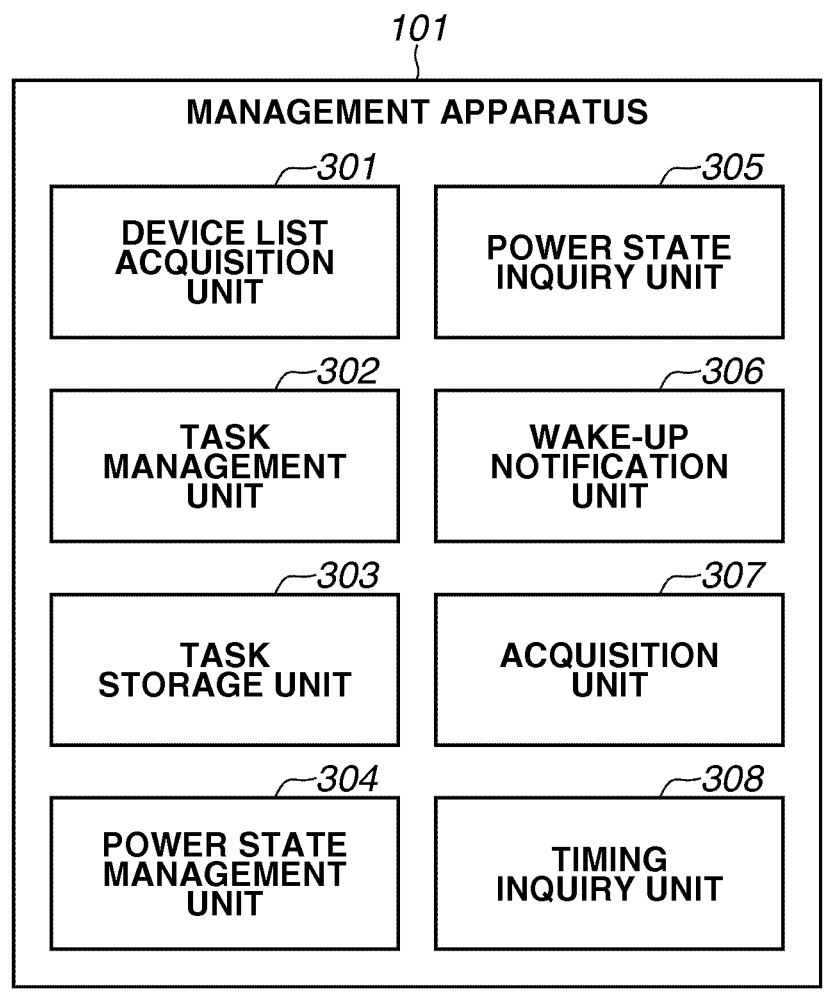
FIG. 3 is a diagram illustrating an example of a software configuration of the management apparatus.

In the software configuration of the management apparatus 101, FIG. 3 illustrates an example of a software configuration of a portion particularly relating to the present system.

A device list acquisition unit 301 acquires a device list, on which a list of information of the image forming apparatus 100 is described, from the central management apparatus 102 via the communication I/F unit 201, and stores the device list in the storage device 202. The list of information includes a model name and model information of the image forming apparatus 100.

Based on the device list stored in the storage device 202, a task management unit 302 individually generates, for each of the image forming apparatuses 100, a task in which identification information (including a model name and model information) for identifying the image forming apparatus 100 and a processing content are described.

A task storage unit 303 stores the task individually generated by the task management unit 302 for each image forming apparatus 100 in a queue within the storage device 202. The task storage unit 303 associates information about the timing of storing the task in the queue (hereinafter, simply referred to as "timing") with the task, and stores the timing with the task in a timed task store within the storage device 202. When the specified timing is reached, the task storage unit 303 stores the task in the queue. Further, the task storage unit 303 acquires the task stored in the queue. The task storage unit 303 associates the task with the processing order (number) of the task and stores the task with the order in the queue, so as to acquire the task from the earlier order (smaller number). The timed task store will be described below with reference to FIG. 9.

The power state management unit 304 associates a power state notification received from the image forming apparatus 100 with the identification information of the image forming apparatus 100, stores the notification with the information in a power state store within the storage device 202, and manages the power state.

A power state inquiry unit 305 acquires the power state notification of the image forming apparatus 100 managed by the storage device 202 to determine the power state thereof.

In a case where the image forming apparatus 100 is in a sleep state when the power state notification of the image forming apparatus 100 is acquired by the power state inquiry unit 305, a wake-up notification unit 306 sends a wake-up notification to the image forming apparatus 100.

An acquisition unit 307 analyzes the task acquired by the task storage unit 303, acquires the device information (hereinafter, simply referred to as "information") including log information and a counter value held by the image forming apparatus 100, and stores the acquired information in the storage device 202. In the present exemplary embodiment, the acquisition unit 307 acquires a job log, as an example. However, instead of acquiring the job log, the acquisition unit 307 may acquire counter information or other information. Further, the function of the acquisition unit 307 may be realized by causing the CPU 203 to execute a plurality of threads simultaneously. By executing a plurality of threads simultaneously, the CPU 203 can perform processing of analyzing the task and acquiring the job log from the image forming apparatus 100 in parallel for the number of threads, so as to realize efficient processing. However, an upper limit is provided on the number of threads because the number of threads depends on specifications of the management apparatus 101. Specifically, the CPU 203 determines the upper limit of the number of threads according to the capacity of the memory 204 for loading and executing the program. The specific processing will be described below with reference to FIG. 6, FIG. 10, and FIG. 15.

A timing inquiry unit 308 makes an inquiry to a queue storage timing store stored in the storage device 202. The queue storage timing store will be described below in detail with reference to FIG. 11.

With reference to the flowchart illustrated in FIG. 4, Job log acquisition processing executed by the CPU 203 of the management apparatus 101 according to the present exemplary embodiment will be described.

Figure 4:
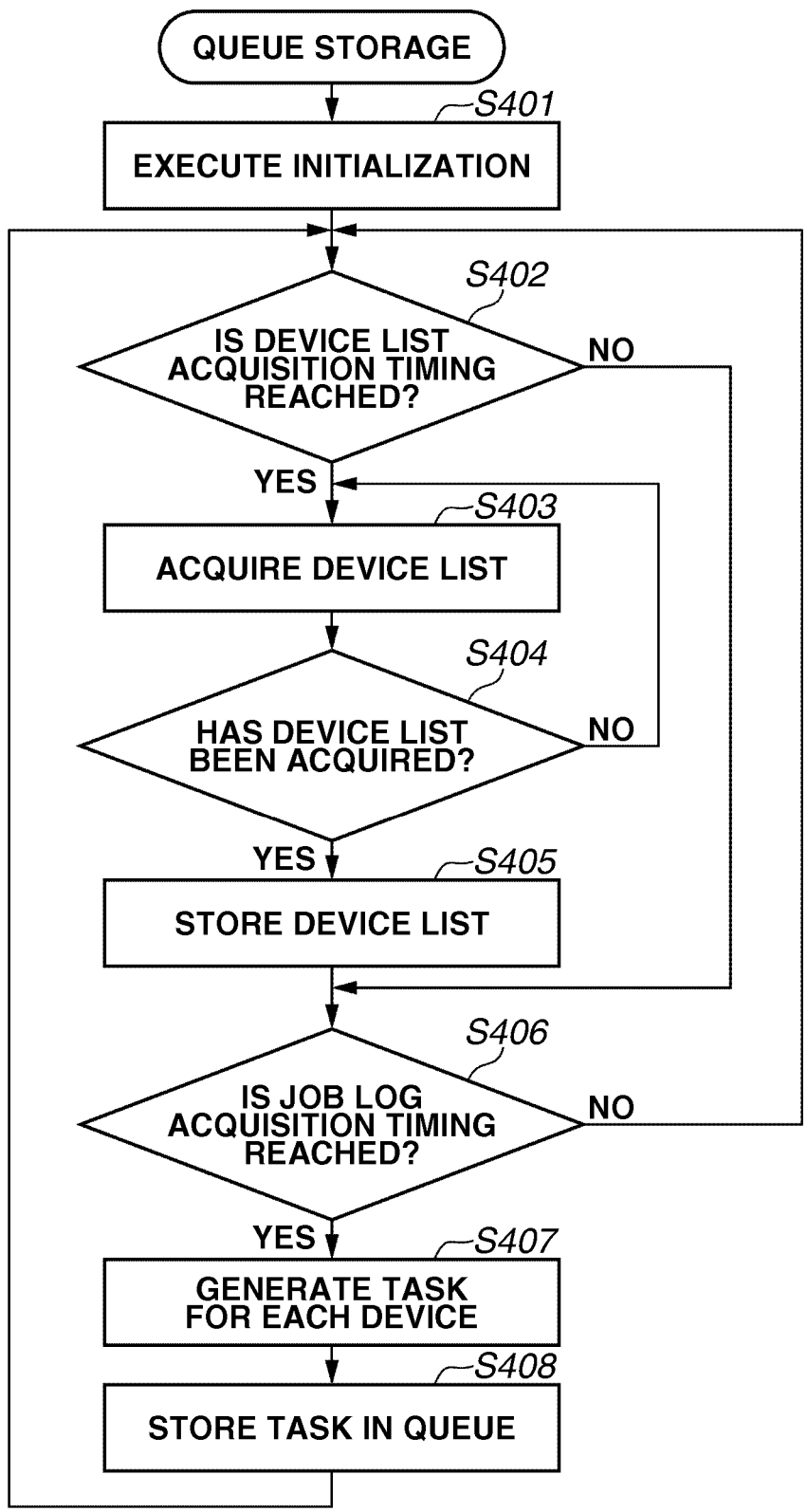
FIG. 4 is a flowchart illustrating an example of processing of the management apparatus according to the first exemplary embodiment.

FIG. 4 is a flowchart illustrating an example of processing in which the CPU 203 of the management apparatus 101 according to the present exemplary embodiment stores the task in the queue.

In step S401, the CPU 203 executes initialization processing necessary to operate various programs, and the processing proceeds to step S402. This initialization processing includes initialization of communication processing between the management apparatus 101 and the image forming apparatus 100, initialization of system setting, and initialization of a variable.

In step S402, the CPU 203 determines whether the central management apparatus 102 reaches device list acquisition timing. If the central management apparatus 102 reaches the device list acquisition timing (YES in step S402), the processing proceeds to step S403.

In step S403, the CPU 203 accesses the central management apparatus 102 via the communication I/F unit 201 to acquire a device list as a management target. Then, the processing proceeds to step S404.

On the other hand, in step S402, if the CPU 203 determines that the central management apparatus 102 does not reach the device list acquisition timing (NO in step S402), the processing proceeds to step S406.

In step S404, the CPU 203 determines whether the device list has been acquired. If the CPU 203 determines that the device list has been acquired (YES in step S404), the processing proceeds to step S405.

In step S405, the CPU 203 stores the device list in the storage device 202, and the processing proceeds to step S406.

On the other hand, in step S404, if the CPU 203 determines that the device list has not been acquired (NO in step S404), the processing proceeds to step S403.

In step S406, the CPU 203 determines whether the image forming apparatus 100 reaches job log acquisition timing. If the CPU 203 determines that the image forming apparatus 100 reaches the job log acquisition timing (YES in step S406), the processing proceeds to step S407. In step S407, based on the device list stored in the storage device 202, the CPU 203 generates a task in which the identification information and the processing content of the image forming apparatus 100 are described for each image forming apparatus 100. Then, the processing proceeds to step S408.

On the other hand, in step S406, if the CPU 203 determines that the image forming apparatus 100 does not reach the job log acquisition timing (NO in step S406), the processing proceeds to step S402.

In step S408, the CPU 203 stores the task generated in step S407 in the queue within the storage device 202, and the processing proceeds to step S402. The above-described storage processing is an example of a first management processing.

The task will be described with reference to FIG. 5.

Figure 5:
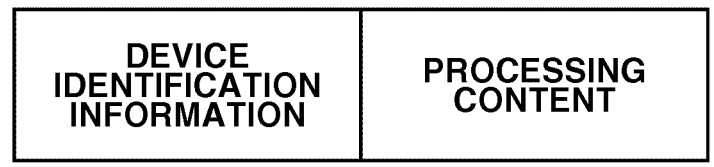
FIG. 5 is a diagram illustrating an example of a task according to the first exemplary embodiment.

FIG. 5 is a diagram illustrating an example of the task.

The task includes device identification information and processing content information.

The device identification information may include any information such as an IP address, a device ID, or a device model which can uniquely identify the image forming apparatus 100. The processing content includes information of acquiring a job log or counter information.

Hereinafter, with reference to the flowchart in FIG. 6, job log acquisition processing executed by the CPU 203 of the management apparatus 101 according to the present exemplary embodiment will be described.

Figure 6:
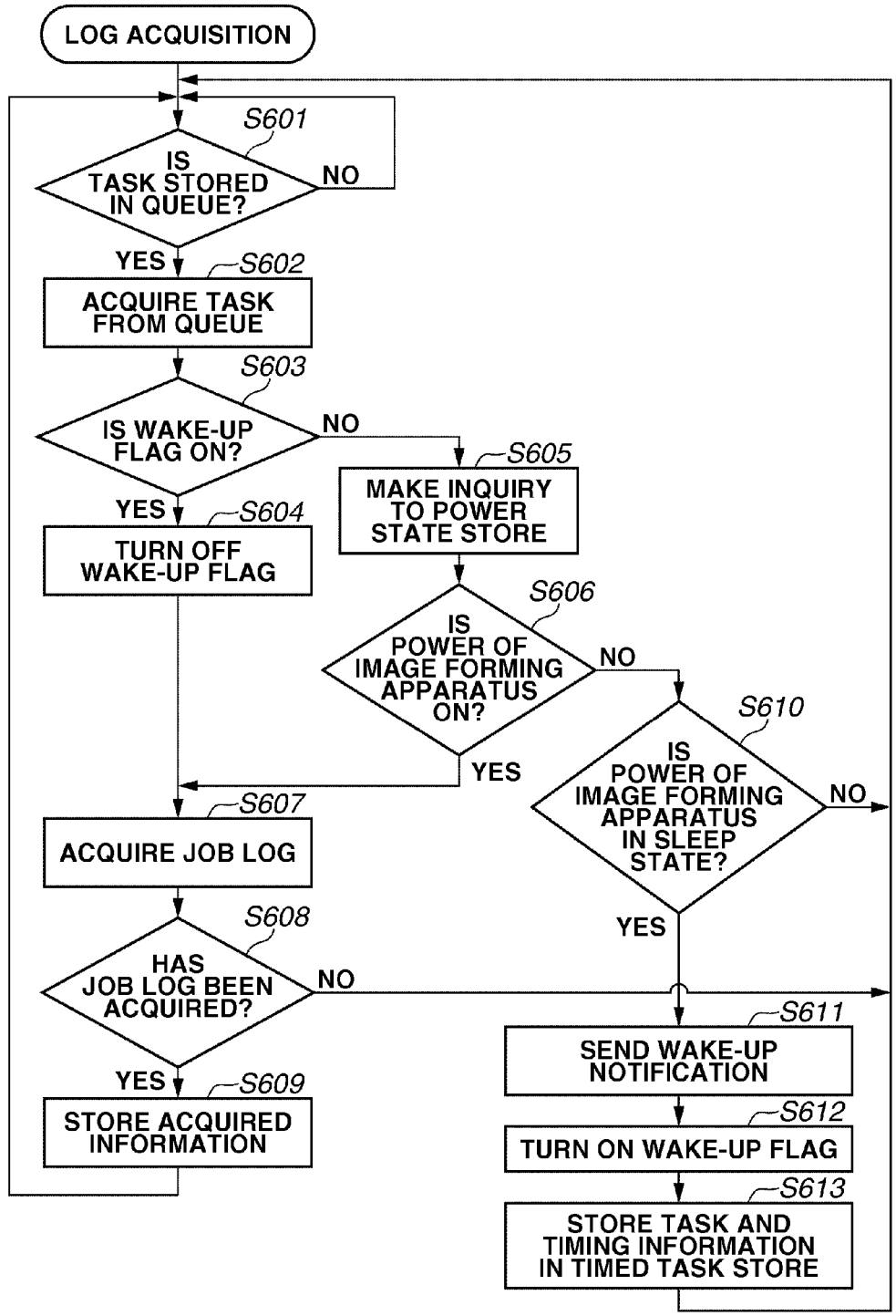
FIG. 6 is a flowchart illustrating an example of processing of the management apparatus according to the first exemplary embodiment.

FIG. 6 is a flowchart illustrating an example of processing in which the CPU 203 of the management apparatus 101 according to the present exemplary embodiment acquires the task from the queue to acquire the job log from the image forming apparatus 100.

In step S601, the CPU 203 determines whether the task is stored in the queue. If the CPU 203 determines that the task is stored in the queue (YES in step S601), the processing proceeds to step S602.

On the other hand, in step S601, if the CPU 203 determines that the task is not stored in the queue (NO in step S601), the CPU 203 repeats the same processing.

In step S602, the CPU 203 acquires the task from the queue, and the processing proceeds to step S603. In step S603, the CPU 203 determines whether a wake-up notification has been sent to the image forming apparatus 100 in advance. If the CPU 203 determines that the wake-up notification has been sent (YES in step S603), the processing proceeds to step S604. In the present exemplary embodiment, as an example of a method for determining whether the wake-up notification has been sent by the CPU 203, a managing method using a flag is used. The flag according to the present exemplary embodiment is binary variables such as "ON/OFF" (1/0) expressed by the CPU 203. In the present exemplary embodiment, the flag is "ON" if the CPU 203 has sent the wake-up notification, and the flag is "OFF" if the CPU 203 has not sent the wake-up notification. Further, the CPU 203 manages a wake-up notification state of the image forming apparatus 100 at a wake-up notification management store within the storage device 202, which will be described below with reference to FIG. 7. In other words, in step S603, the CPU 203 determines whether a wake-up flag is ON.

The wake-up notification management store will be described with reference to FIG. 7.

FIG. 7 is a diagram illustrating an example of the wake-up notification management store.

The wake-up notification management store includes device identification information and information about the wake-up notification flag.

The device identification information may include any information such as an IP address, a device ID, or a device model, which can uniquely identify the image forming apparatus 100. Further, the information about the wake-up notification flag may include any information that can inform whether the wake-up notification has been sent.

In step S604, the CPU 203 turns "OFF" the wake-up notification flag of the image forming apparatus 100.

On the other hand, in step S603, if the CPU 203 determines that the wake-up notification has not been sent, in other words, if the CPU 203 determines that the wake-up flag is not "ON" (NO in step S603), the processing proceeds to step S605.

In step S605, the CPU 203 makes an inquiry about the power state of the image forming apparatus 100 to a power state store within the storage device 202, which will be described below with reference to FIG. 8, and the processing proceeds to step S606.

The power state store will be described with reference to FIG. 8.

FIG. 8 is a diagram illustrating an example of the power state store.

The power state store includes device identification information and power state information.

The device identification information may include any information such as an IP address, a device ID, or a device model, which uniquely identifies the image forming apparatus 100. Further, the power state information is information such as "sleep", "power ON", and "power OFF".

In step S606, the CPU 203 determines whether the power state of the image forming apparatus 100 managed by the power state store is "power ON". If the CPU 203 determines that the power state is "power ON" (YES in step S608), the processing proceeds to step S607.

In step S607, the CPU 203 acquires a job log from the image forming apparatus 100, and the processing proceeds to step S608.

In step S608, the CPU 203 determines whether the job log has been acquired. If the CPU 203 determines that the job log has been acquired (YES in step S608), the processing proceeds to step S609.

In step S609, the CPU 203 stores the job log acquired from the image forming apparatus 100 in the storage device 202, and the processing proceeds to step S601.

In addition, the CPU 203 may execute the processing performed in steps S607 through S609 in parallel by a plurality of threads.

On the other hand, in step S608, if the CPU 203 determines that the job log has not been acquired (NO in step S608), the processing proceeds to step S601.

Further, in step S606, if the CPU 203 determines that the power state is not "power ON" (NO in step S606), the processing proceeds to step S610.

In step S610, the CPU 203 determines whether the power state of the image forming apparatus 100 managed by the power state store is "sleep". If the CPU 203 determines that the power state is "sleep" (YES in step S610), the processing proceeds to step S611. On the other hand, in step S610, if the CPU 203 determines that the power state is not "sleep" (NO in step S610), the processing proceeds to step S601.

In step S611, the CPU 203 sends a wake-up notification to the image forming apparatus 100, and the processing proceeds to step S612.

In step S612, the CPU 203 turns "ON" the wake-up flag of the image forming apparatus 100. Then, the processing proceeds to step S613.

In step S613, the CPU 203 stores information about the task acquired from the queue in step S602 and information about the timing of storing the task in the queue in a timed task store within the storage device 202, which will be described below with reference to FIG. 9. Then, the processing proceeds to step S601. The timing of storing (returning) the task in the queue is the timing in which the time taken for the image forming apparatus 100 to shift from the sleep state to the normal state is taken into consideration, which enables the CPU 203 to execute information acquisition processing when the image forming apparatus 100 is in the normal state. In the present exemplary embodiment, the CPU 203 specifies predetermined timing. However, the timing is not limited thereto. In addition, the above-described processing executed by the CPU 203 of removing the task from the queue temporarily and storing the removed task in the timed task store is an example of a second management processing.

The timed task store will be described with reference to FIG. 9.

FIG. 9 is a diagram illustrating an example of the timed task store.

The timed task store includes information about the timing of storing (returning) the task in the queue and information about the task.

The information about the timing of storing the task in the queue may include information about a specified date and time, or information for the CPU 203 to count down and manage a preset counter value (for example, the number of seconds).

Further, in step S613 of the flowchart in FIG. 6, when the information about the task and the information about the timing of storing the task in the queue are stored in the timed task store, the CPU 203 specifies predetermined timing. However, depending on the model of the image forming apparatus 100, in order to shift from the sleep state to the normal state, one model needs a longer time whereas the other model needs a shorter time. Furthermore, the time taken for the image forming apparatus 100 to shift from the normal state to the sleep state may vary depending on the model. Therefore, by taking the above situation into consideration, the CPU 203 may control the specified timing depending on the model. Further, as for the image forming apparatus 100 that quickly shifts from the sleep state to the normal state, the CPU 203 may simply wait without storing the information about the task and the information about the timing of storing the task in the queue in the timed task store. For example, the information in which "identification information" for a plurality of the image forming apparatuses 100 is associated with a "recovery time" for each of the image forming apparatuses 100 to recover from the sleep state to the normal state is set in the memory 204. In addition, for example, information which defines a "threshold value" to determine whether the recovery time from the sleep state to the normal state is fast (for example, a time less than one second) is stored in the memory 204. When the management-target image forming apparatus 100 is in a power saving state, the CPU 203 compares the "recovery time" corresponding to the identification information of the image forming apparatus 100 with the "threshold value (less than 1 second)", both of which are stored in the memory 204. Further, when the "recovery time" is longer than the "threshold value", the CPU 203 stores the information about the task and the information about the timing of storing the task in the queue in the timed task store, while the CPU 203 waits for a response from the image forming apparatus 100 without storing the information thereof when the "recovery time" is shorter than the "threshold value". In the present exemplary embodiment, the "threshold value" is less than one second. However, the "threshold value" is not limited thereto. In addition, a different "threshold value" may be set for each model of the image forming apparatus 100 in the memory 204.

The above-described processing will be described with reference to FIG. 10.

Figure 10:
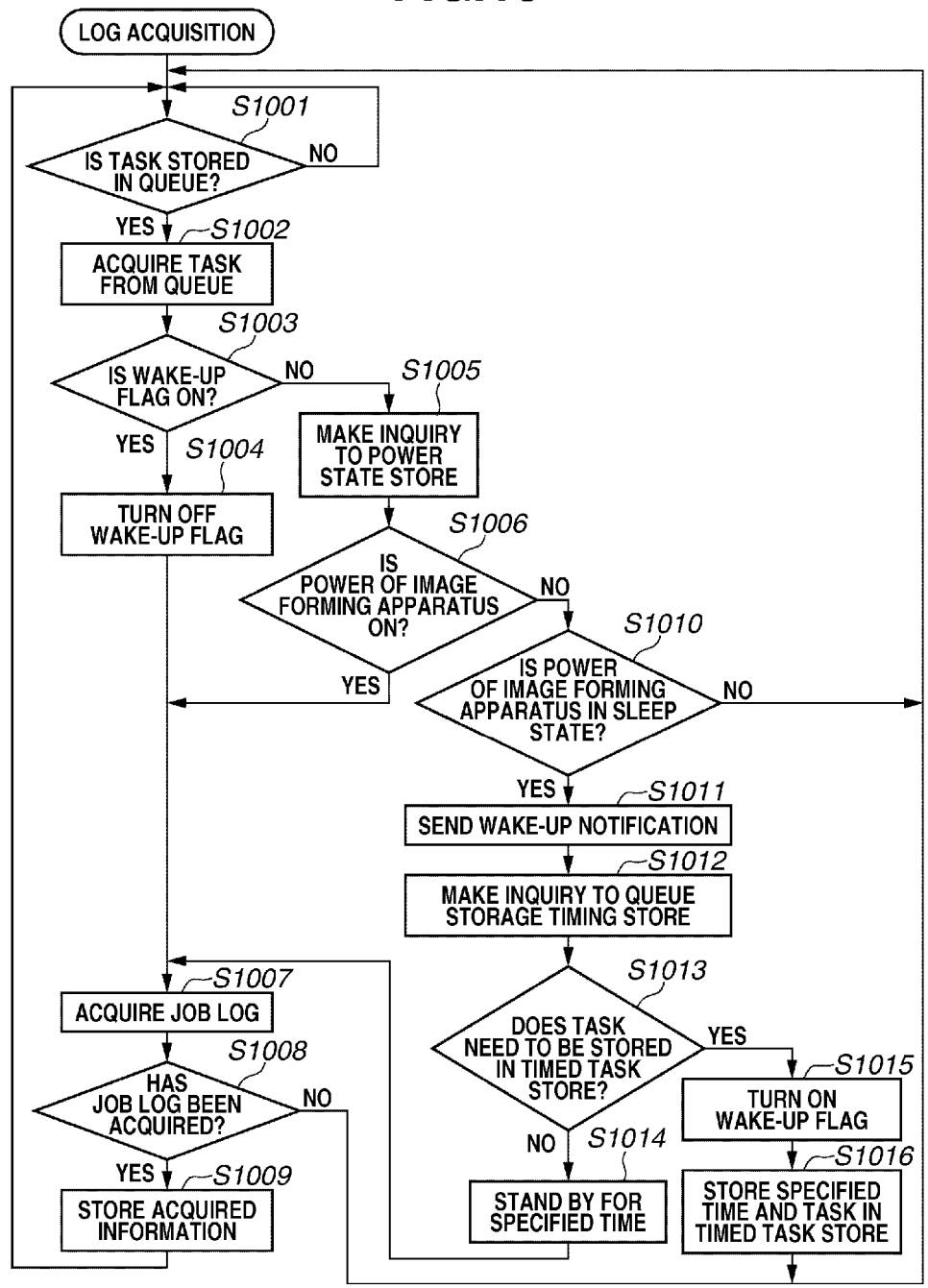
FIG. 10 is a flowchart illustrating an example of processing of the management apparatus according to the first exemplary embodiment.

FIG. 10 is a flowchart illustrating an example of processing in which the CPU 203 of the management apparatus 101 according to the present exemplary embodiment acquires the task from the queue to acquire the job log from the image forming apparatus 100.

The processing in steps S1001 through S1011 in FIG. 10 is the same as the processing in steps S601 through S611 in FIG. 6, and thus the description thereof will be omitted. In addition, in the same manner as the first exemplary embodiment, the CPU 203 may execute the processing in steps S1007 through S1009 in parallel by a plurality of threads.

In step S1012, the CPU 203 makes an inquiry to the queue storage timing store within the storage device 202, which will be described below with reference to FIG. 11, about whether to store the task in the queue. Then, the processing proceeds to step S1013.

The queue storage timing store will be described with reference to FIG. 11.

FIG. 11 is a diagram illustrating an example of the queue storage timing store.

The queue storage timing store includes device identification information, information about whether the task needs to be stored in the timed task store, and time information.

The device identification information may include any information such as an IP address, a device ID, or a device model which can uniquely identify the image forming apparatus 100. Further, the CPU 203 manages the information about whether the task needs to be stored in the timed task store by associating that information with the image forming apparatus 100. In addition, the CPU 203 performs management by associating the image forming apparatus 100 corresponding to the task that needs to be stored in the timed task store, with a time from when the task is acquired from the timed task store until the task is stored in the queue. Furthermore, the CPU 203 performs management by associating the image forming apparatus 100 corresponding to the task that does not need to be stored in the timed task store, with a stand-by time.

In step S1013, based on a processing result in the step S1012, the CPU 203 determines whether the image forming apparatus 100 is a model corresponding to the task that needs to be stored in the timed task store. If the CPU 203 determines that the image forming apparatus 100 is a model corresponding to the task that does not need to be stored in the timed task store (NO in step S1013), the processing proceeds to step S1014.

In step S1014, the CPU 203 waits for the time specified by the queue storage timing store. Then, the processing proceeds to step S1007.

On the other hand, in step S1013, if the CPU 203 determines that the image forming apparatus 100 is a model corresponding to the task that needs to be stored in the timed task store (YES in step S1013), the processing proceeds to step S1015.

In step S1015, the CPU 203 turns "ON" the wake-up notification flag of the image forming apparatus 100. Then, the processing proceeds to step S1016.

In step S1016, the CPU 203 stores the time specified by the queue storage timing store and the task in the timed task store, and the processing proceeds to step S1001. In addition, the above-described processing executed by the CPU 203 of removing the task from the queue temporarily and storing the removed task in the timed task store is an example of the second management processing.

With reference to the flowchart illustrated in FIG. 12, timed task processing executed by the CPU 203 of the management apparatus 101 according to the present exemplary embodiment will be described.

Figure 12:
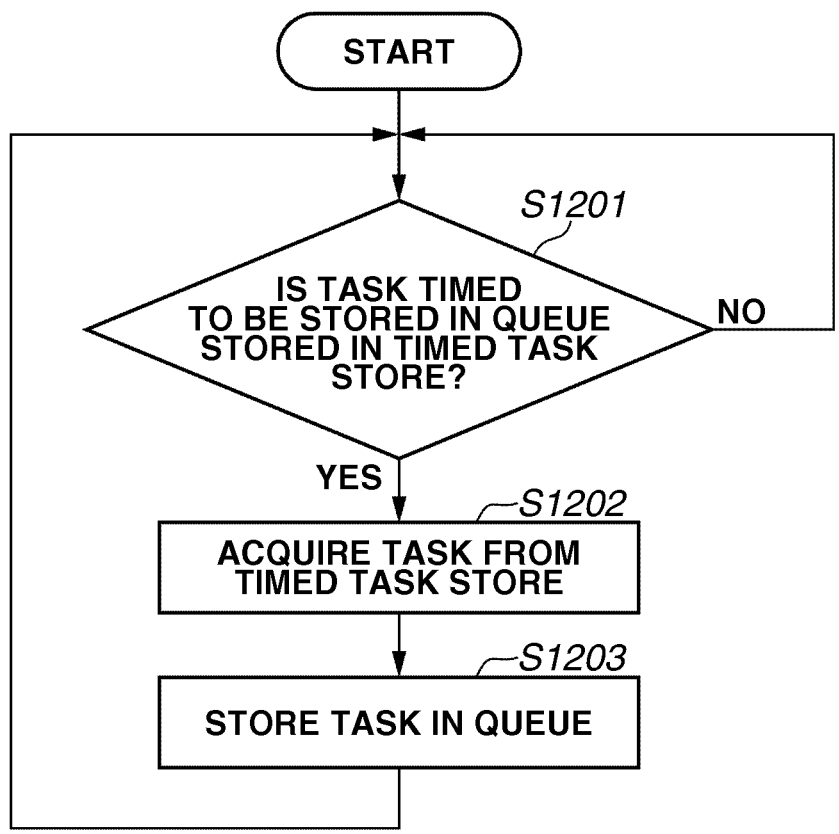
FIG. 12 is a flowchart illustrating an example of processing of the management apparatus according to the first exemplary embodiment.

FIG. 12 is a flowchart illustrating an example of processing in which the CPU 203 of the management apparatus 101 according to the present exemplary embodiment acquires the task stored in the timed task store and stores (returns) the task in the queue.

In step S1201, the CPU 203 determines whether the task timed to be stored in the queue is stored in the timed task store. If the CPU 203 determines that the task timed to be stored in the queue is stored therein (YES in step S1201), the processing proceeds to step S1202.

In step S1202, the CPU 203 acquires the task from the timed task store. Then, the processing proceeds to step S1203.

In step S1203, the CPU 203 stores the task acquired from the timed task store in the queue, and the processing proceeds to step S1201. At this time, the CPU 203 stores the task acquired from the timed task store so as to cause the acquired task to be placed at the end of the order of the tasks and the processing order thereof stored in the queue.

On the other hand, in step S1201, if the CPU 203 determines that the task timed to be stored in the queue is not stored in the timed task store (NO in step S1201), the CPU 203 executes the processing in step S1201 again.

As described above, when the CPU 203 acquires information from the image forming apparatus 100 being in a "sleep" state, the CPU 203 can efficiently perform the processing by eliminating the stand-by time at which the image forming apparatus 100 shifts from the sleep state to the normal state.

In the above-described first exemplary embodiment, when the CPU 203 stores the task acquired from the timed task store in the queue, the CPU 203 simply stores the task without controlling the order thereof. However, the CPU 203 may control the order of the task.

Hereinafter, the present exemplary embodiment will be described with reference to FIG. 13.

Figure 13:
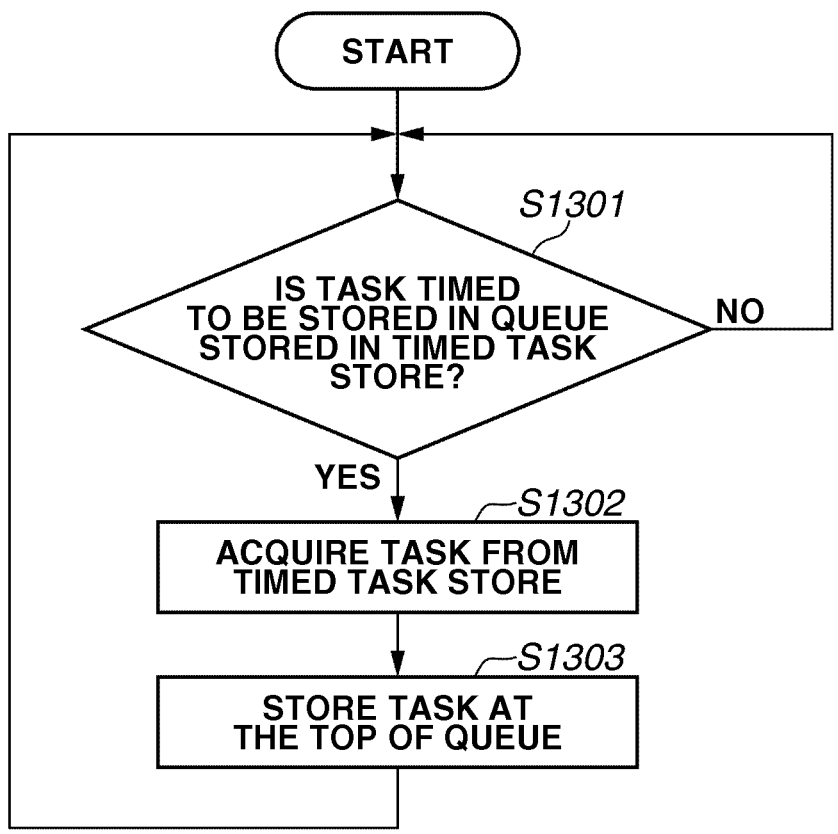
FIG. 13 is a flowchart illustrating an example of processing of the management apparatus according to the second exemplary embodiment.

FIG. 13 is a flowchart illustrating an example of processing in which the CPU 203 of the management apparatus 101 according to the present exemplary embodiment acquires the task stored in the timed task store and stores the task in the queue.

In step S1301, the CPU 203 determines whether the task timed to be stored in the queue is stored in the timed task store. If the CPU 203 determines that the task timed to be stored in the queue is stored therein (YES in step S1301), the processing proceeds to step S1302.

In step S1302, the CPU 203 acquires the task from the timed task store. Then, the processing proceeds to step S1303.

In step S1303, the CPU 203 stores the task acquired from the timed task store in the top of the queue. Then, the processing proceeds to step S1301. In other words, the CPU 203 stores the task acquired from the timed task store so as to cause the acquired task to be placed at the beginning of order of the tasks and the processing order thereof stored in the queue.

On the other hand, in step S1301, if the CPU 203 determines that the task timed to be stored in the queue is not stored in the timed task store (NO in step S1301), the CPU 203 executes the processing in step S1301 again.

Other flows of processing executed by the CPU 203 such as the processing of storing the task in the queue, and the processing of acquiring the information such as the job log from the image forming apparatus 100 based on the task acquired from the queue are the same as the flows of processing in FIG. 4 and FIG. 6 described in the first exemplary embodiment.

As described above, when the CPU 203 stores the task acquired from the timed task store in the queue, the CPU 203 controls the order of the task to store the acquired task in the top of the queue. With this operation, the stand-by time in the queue can be eliminated, and thus the processing can be executed more efficiently.

In the above-described second exemplary embodiment, the CPU 203 realizes the efficient processing by controlling the order of the task in the queue. The same effect can be achieved by providing a priority queue different from the queue described in the first and the second exemplary embodiments. The priority queue is a queue for managing the task so that the processing is executed on the image forming apparatus 100 as a processing target in a prioritized manner.

The present exemplary embodiment will be described with reference to FIG. 14 and FIG. 15.

Figure 14:
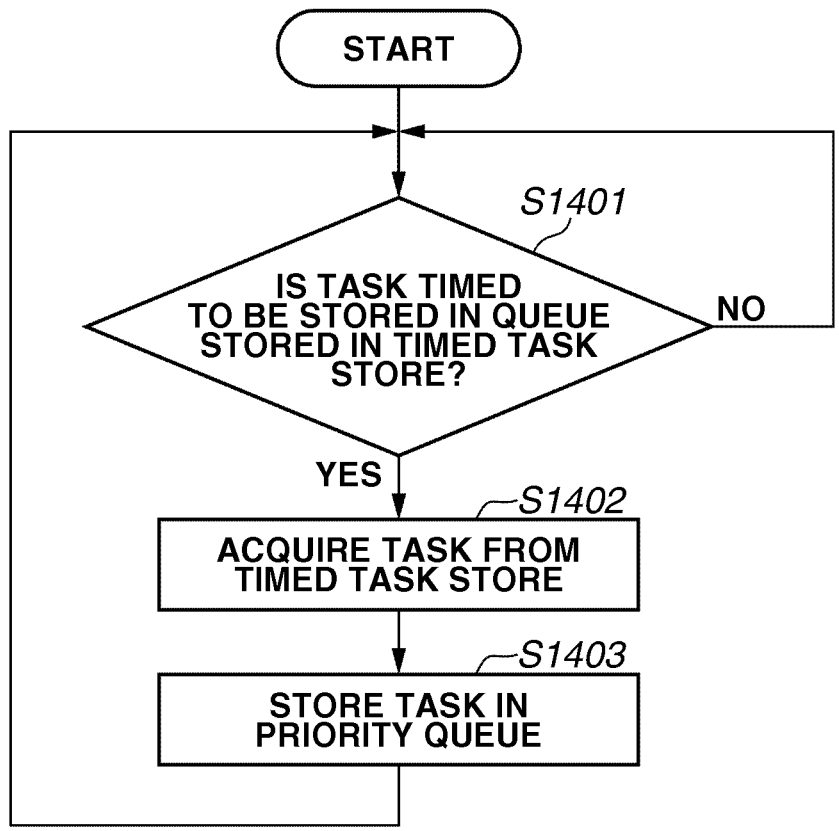
FIG. 14 is a flowchart illustrating an example of processing of the management apparatus according to a third exemplary embodiment.

FIG. 14 is a flowchart illustrating an example of processing in which the CPU 203 of the management apparatus 101 according to the present exemplary embodiment acquires the task stored in the timed task store and stores the task in the queue.

In step S1401, the CPU 203 determines whether the task timed to be stored in the queue is stored in the timed task store. If the CPU 203 determines that the task timed to be stored in the queue is stored therein (YES in step S1401), the processing proceeds to step S1402.

In step S1402, the CPU 203 acquires the task from the timed task store. Then, the processing proceeds to step S1403.

In step S1403, the CPU 203 stores the task acquired from the timed task store in the priority queue. Then, the processing proceeds to step S1401. The above-described processing for storing the task in the priority queue is an example of priority management processing.

On the other hand, in step S1401, if the CPU 203 determines that the task timed to be stored in the queue is not stored in the timed task store (NO in step S1401), the CPU 203 executes the processing in step S1401 again.

With reference to the flowchart illustrated in FIG. 15, job log acquisition processing executed by the CPU 203 of the management apparatus 101 according to the present exemplary embodiment will be described.

Figure 15:
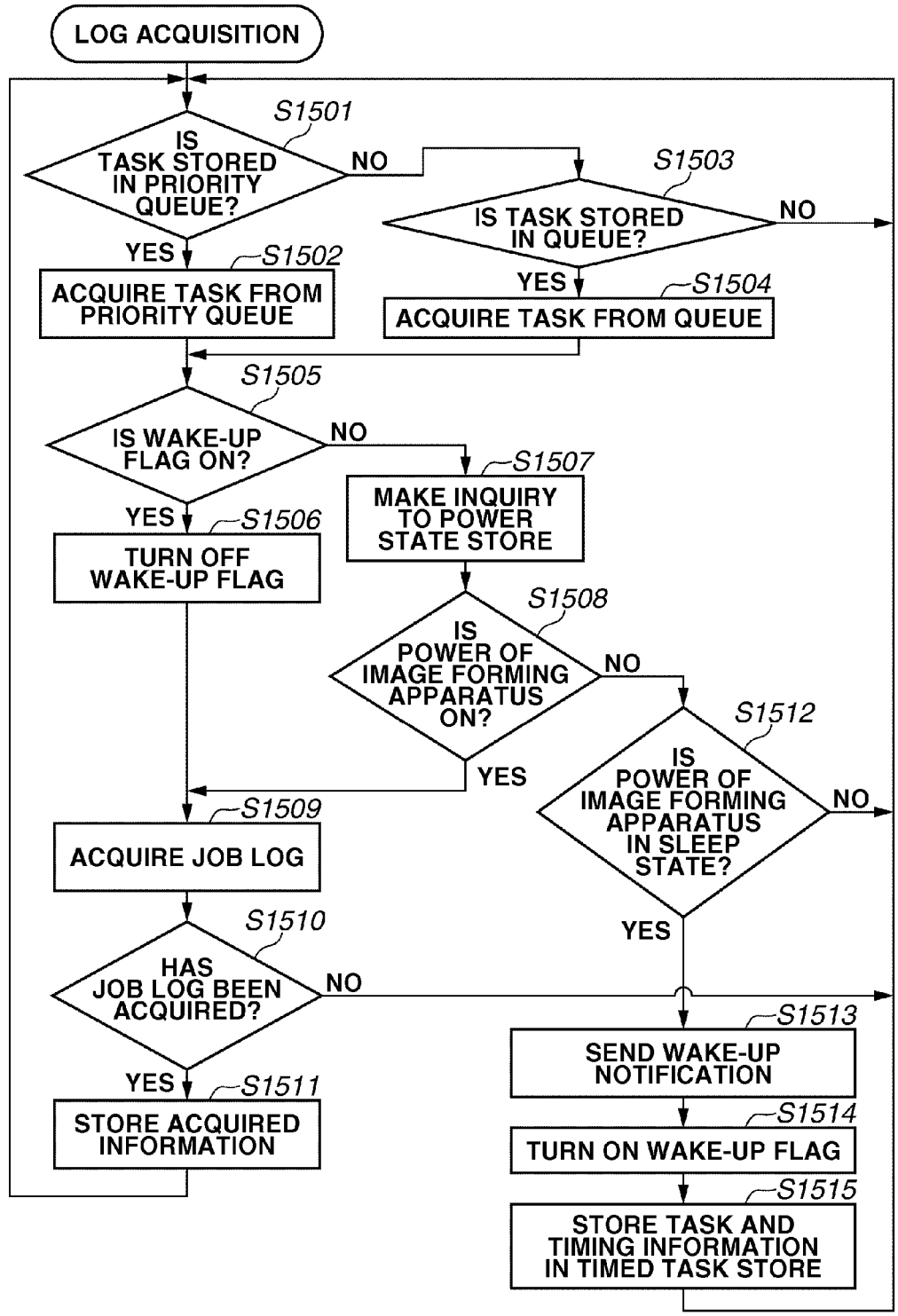
FIG. 15 is a flowchart illustrating an example of processing of the management apparatus according to the third exemplary embodiment.

The flowchart in FIG. 15 illustrates an example of processing in which the CPU 203 of the management apparatus 101 according to the present exemplary embodiment acquires the task from the queue to acquire the job log from the image forming apparatus 100.

In step S1501, the CPU 203 determines whether the task is stored in the priority queue. If the CPU 203 determines that the task is stored in the priority queue (YES in step S1501), the processing proceeds to step S1502.

In step S1502, the CPU 203 acquires the task stored in the priority queue. Then, the processing proceeds to step S1505.

On the other hand, in step S1501, if the CPU 203 determines that the task is not stored in the priority queue (NO in step S1501), the processing proceeds to step S1503.

In step S1503, the CPU 203 determines whether the task is stored in the queue. If the CPU 203 determines that the task is stored in the queue (YES in step S1503), the processing proceeds to step S1504.

In step S1504, the CPU 203 acquires the task stored in the queue. Then the processing proceeds to step S1505.

The processing in steps S1505 through S1515 executed by the CPU 203 is the same as the processing in steps S603 through S613, and thus the description thereof will be omitted. Furthermore, in the same manner as in the first and the second exemplary embodiments, the CPU 203 may execute the processing in steps S1509 through S1511 in parallel by a plurality of threads.

As described above, instead of executing the control processing with a single queue as described in the second exemplary embodiment, the CPU 203 may execute the control processing with a plurality of queues to achieve the same effect as in the second exemplary embodiment to realize the efficient processing.

According to the processing of the above-described exemplary embodiments, when information is acquired from the image forming apparatus 100 being in the "sleep" state, the stand-by time for shifting from the sleep state to the normal state can be eliminated, so that efficient processing with respect to the image forming apparatus 100 can be realized.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and function.

This application claims the benefit of Japanese Patent Application No. 2012-174254 filed Aug. 6, 2012, which is hereby incorporated by reference herein in its entirety.

What is claimed is:

1. An information processing apparatus comprising:
   a memory; and
   a processor in communication with the memory, the processor configured to control:
   a first management unit configured to manage identification information of a plurality of image forming apparatuses as management targets and an order of processing on the plurality of image forming apparatuses;
   a request unit configured to request, according to the order managed by the first management unit, device information from an image forming apparatus having identification information corresponding to the order;
   a removing unit configured to remove, in a case where a power state of the image forming apparatus is a power saving state when the request unit requests the device information from the image forming apparatus, the identification information of the image forming apparatus from a management target by the first management unit so as to prevent the request unit from requesting the device information;
   a sending unit configured to send, to the image forming apparatus corresponding to the removed identification information, a notification for returning from the power saving state to a normal state;
   a second management unit configured to manage the removed identification information of the image forming apparatus together with timing information for specifying timing for returning the removed identification information as the management target by the first management unit.

2. The information processing apparatus according to claim 1, wherein, according to the order managed by the first management unit, the request unit executes processing for requesting device information from an image forming apparatus having identification information corresponding to the order in parallel processing.

3. The information processing apparatus according to claim 2, wherein the request unit determines a number of pieces of the parallel processing based on a specification of the information processing apparatus.

4. The information processing apparatus according to claim 1, wherein the second management unit manages a time preset as the timing information.

5. The information processing apparatus according to claim 1, wherein the second management unit manages a time according to a model of the image forming apparatus as the timing information.

6. The information processing apparatus according to claim 1, wherein the processor is further configured to control:
   a stand-by unit configured to stand by until the image forming apparatus responds to a request made by the request unit in a case where the power state of the image forming apparatus is the power saving state, and a time of returning from the power saving state to the normal state is shorter than a predetermined time;
   wherein, in a case where the power state of the image forming apparatus is the power saving state and the time of returning from the power saving state to the normal state is longer than the predetermined time, the removing unit removes the identification information of the image forming apparatus from the management target by the first management unit, and the second management unit manages the timing information.

7. The information processing apparatus according to claim 1, wherein the processor is further configured to control:
   a control unit configured to, in a case where the removed identification information of the image forming apparatus corresponding to the timing information is returned to the management target by the first management unit based on the timing information managed by the second management unit, execute control for returning the identification information to an end of the order managed by the first management unit.

8. The information processing apparatus according to claim 1, wherein the processor is further configured to control:
a control unit configured to, in a case where the removed identification information of the image forming apparatus corresponding to the timing information is returned to the management target by the first management unit based on the timing information managed by the second management unit, execute control for returning the removed identification information to a beginning of the order managed by the first management unit.

9. The information processing apparatus according to claim 1, wherein the processor is further configured to control:
a priority management unit configured to manage the identification information of the image forming apparatus as a processing target by the request unit in priority to a management target of the first management unit; and
a control unit configured to control the identification information of the image forming apparatus corresponding to the timing information to be a management target by the priority management unit based on the timing information managed by the second management unit.

10. A method for an image forming apparatus, the method comprising:
storing and managing, in a management region, identification information of a plurality of image forming apparatuses as management targets and an order of processing on the plurality of image forming apparatuses while associating the identification information with the order;
requesting device information, according to the order managed in the management region, from an image forming apparatus having identification information corresponding to the order;
removing, in a case where a power state of the image forming apparatus is a power saving state when the device information from the image forming apparatus is requested, the identification information of the image forming apparatus from the management region so as to prevent the device information from being requested;
sending, to the image forming apparatus corresponding to the removed identification information, a notification for returning from the power saving state to a normal state; and
managing timing information for specifying timing for returning the removed identification information of the image forming apparatus to the management region.

11. A non-transitory computer-readable storage medium storing a computer program that causes a computer to execute a method for an information processing apparatus, the method comprising:
storing and managing, in a management region, identification information of a plurality of image forming apparatuses as management targets and an order of processing on the plurality of image forming apparatuses while associating the identification information with the order;
requesting device information, according to the order managed in the management region, from an image forming apparatus having identification information corresponding to the order;
removing, in a case where a power state of the image forming apparatus is a power saving state when the device information from the image forming apparatus is requested, the identification information of the image forming apparatus from the management region so as to prevent the device information from being requested;
sending, to the image forming apparatus corresponding to the removed identification information, a notification for returning from the power saving state to a normal state; and
managing timing information for specifying timing for returning the removed identification information of the image forming apparatus to the management region.

* * * * *